2 Claims. (Cl. 121—46)

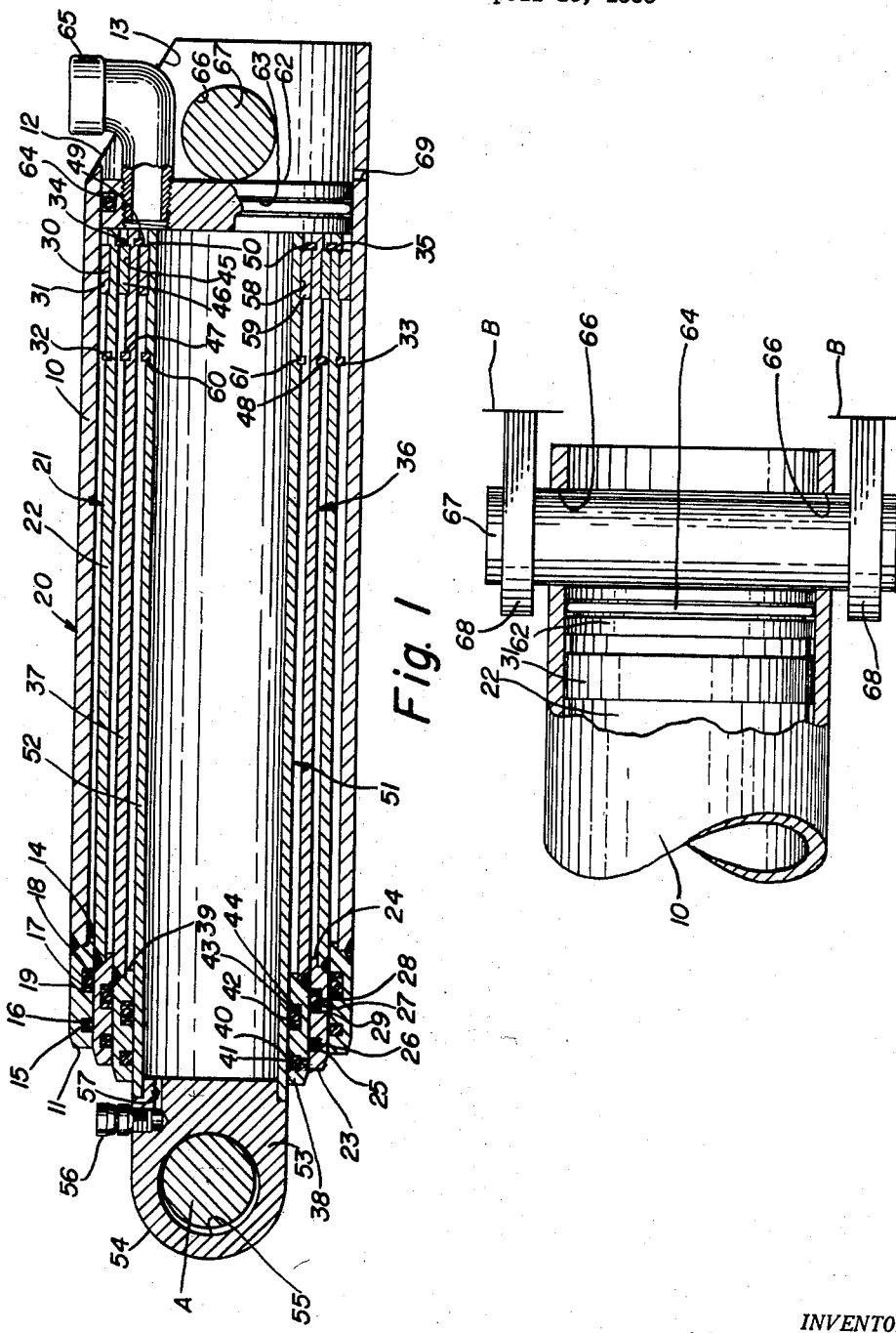
INVENTORS
LOUIS S. WOOD
LESLIE F. HANSEN
BY
ATTORNEYS 2,854,958
TELESCOPIC CYLINDER ASSEMBLY Louis S. Wood, Findlay, and Leslie F. Hansen, Galion, Ohio, assignors to The Perfection Steel Body Company, Galion, Ohio, a corporation of Ohio Application April 15, 1955, Serial No. 501,630

This invention relates generally to fluid-actuated telescopic cylinders and more particularly to cylinders for use in dump body hoists and the like.

It is a primary object of our invention to provide a telescopic cylinder of the character described which is so assembled and constructed as to permit ready and convenient replacement or rehabilitation of the parts thereof, when necessary.

Another object of our invention is to provide a cylinder of the character described having a structure which is so assembled as to provide convenient access to the operating parts thereof.

Still another object of our invention is to provide a cylinder of the character described which is simplified in construction and less costly to manufacture.

Other objects and advantages of our invention will be apparent during the course of the following description.

In the acompanying drawings forming a part of this specification and in which like numerals are employed to designate like parts throughout the same, Fig. 1 is a longitudinal cross-sectional view of a telescopic cylinder assembly embodying the features of our invention.

Fig. 2 is a fragmentary plan view of the base portion of the cylinder assembly, with portions thereof removed to show details.

Referring more particularly to the drawings, we have disclosed a representative form of telescopic cylinder assembly adapted for utilization in dump body hoists. The assembly includes an outer or stationary cylinder 10, which is preferably formed of metal tubing, such as steel, and which has fixedly secured and integrated therewith, as by welding, at its forward end, a sealing or packing collar 11. At its rearward or base end, the cylinder 10 is angularly truncated, as at 12, to provide a cylinder wall opening 13.

The packing collar or ring 11 provides an extension of the cylinder 10 which is of slightly smaller internal diameter than the bore of the cylinder 10 itself and thus provides an internal shoulder 14. The ring 11 is provided with an annular internal groove or recess 15 which accommodates a wiping ring 16 of leather or other suitable material. The packing collar 11 is also provided with another internal annular groove or recess 17 which is spaced rearwardly of the recess 15 and serves to accommodate a resilient O-ring 18 which is preferably nested between a pair of annular support or retainer elements 19 which serve to restrict the deformation of O-ring 18 during telescoping movement of the cylinder assembly. The cylinder 10 and the components thereof, above described, constitute a stationary or outer barrel assembly, indicated by the reference numeral 20.

Slidably disposed within the stationary barrel assembly 20 is a movable barrel assembly 21 which includes a cylinder 22 which is of smaller diameter than cylinder 10, but which has wiping engagement with the packing collar 11. The cylinder 22 is provided at its forward end with an integrated packing collar 23 forming an extension of the cylinder 22, but having a smaller internal diameter than the bore of the cylinder, thus providing an internal annular shoulder 24. The collar 23 is substantially the same as the packing collar 11 and is provided with an annular recess 25 adapted to retain a wiping ring 26, and with an annular O-ring 28 and supporting elements 29.

Adjacent the rear end of the cylinder 22, a circumferential recess 30 is provided which is adapted to accommodate an axially grooved guide ring or bushing 31 which slidably engages the wall of cylinder 10 and thus serves to support and guide this end of the cylinder 22 during its movement. Forwardly of the guide ring 31, the cylinder 22 is provided with a circumferential recess 32 which serves to accommodate and retain an external stop ring 33 which projects radially from the wall of the cylinder 22 into the annular space between cylinders 10 and 22. Rearwardly of the guide ring 31, and in a plane adjacent thereto, the cylinder 22 is provided with an annular recess 34 in which is retained an internal stop ring 35 which projects into the bore of the cylinder 22.

Slidably disposed within the above-described movable barrel assembly 21 is another or second movable barrel assembly 36 which includes a cylinder 37 which is of smaller diameter than cylinder 22, but which has wiping engagement with the packing collar 23. The cylinder 37 is slightly longer than cylinder 22 and is provided at its forward end with an integrated packing collar 38 which forms an extension of the cylinder but has a smaller bore than the bore of cylinder 37, thus providing an internal annular shoulder 39. The collar 38 is of substantially the same design as the collar 23 and is provided with an annular recess 40 retaining a wiping ring 41, and with an annular recess 42 retaining an O-ring 43 and supporting elements 44.

Adjacent the rear end of the cylinder 37, a circumferential recess 45 is provided to accommodate a metal guide ring 46 which is grooved axially and which slidably engages the wall of cylinder 22 and serves to support and guide this end of the cylinder 37 during its movement. Forwardly of the guide ring 46, the cylinder 37 is provided with a circumferential recess 47 which serves to retain an external stop ring 48 which projects radially into the annular space between cylinders 37 and 22. Rearwardly of the guide ring 46, and in a plane adjacent thereto, the cylinder 37 is provided with an annular recess 49 in which is retained an internal stop ring 50 which projects into the bore of the cylinder 37.

Slidably disposed within the above-described barrel assembly 36 is a movable plunger assembly 51 which includes a cylinder 52 which is of smaller diameter and slightly longer than cylinder 37, but which has wiping engagement with the packing collar 38. The forward end of cylinder 52 is closed by means of a plug 53 which is welded thereto. The plug 53 has a forwardly extending connector or ear 54 which is apertured as at 55. The ear 54 is adapted to be operatively connected to any suitable load element A which is to be actuated, and which, in this instance, may represent a cross-bar on a truck dump body. A bleeder screw 56 is threadedly secured to the plug 53 and intercepts a passageway or channel 57 which communicates with the bore of cylinder 52. The bleeder screw functions in a conventional manner well known to the art.

Adjacent the rear end of the cylinder 52, a circumferential recess 58 is provided to accommodate an axially grooved guide ring 59 which slidably engages the wall of cylinder 37 and serves to support and guide this end of cylinder 52 during movement thereof. Forwardly of the guide ring 59, the cylinder is provided with a circumferential recess 60 which serves to retain an external stop ring 61 which projects radially into the annular space between cylinders 52 and 37.

The rear ends of the barrel assemblies 21 and 36 and the plunger assembly 51 are all in abutment with a disk or base plate 62 which is slidably mounted in the bore of cylinder 10 forwardly of the truncated portion 12 thereof. The base plate 62 serves as a seal or closure for the cylinder 10, and is provided with a circumferential recess 63 in which is retained an O-ring 64 which has sealing engagement with the wall of the cylinder 10. The base plate 62 has threadedly secured thereto a suitable fitting 65 which communicates with the interior of the cylinder 10 and is adapted to direct fluid under pressure into the assembly.

Rearwardly of the base plate 62 the wall of cylinder 10 is provided with diametrically aligned openings 66 by means of which the cylinder assembly may be pivotally secured to a connecting rod or shaft 67 which is removably mounted in suitable trunnions or bearing supports 68 which are secured to the reaction member B, which, is this instance, may be an element of a truck chassis. The base plate 62 is thus retained by shaft 67 against rearward displacement, without the necessity of additional securement.

When the cylinder assembly is initially primed or loaded with hydraulic fluid, it is worked to bleed out all entrapped air through the bleeder valve 56. When all the air has been thus vented, the hydraulic fluid completely fills the cylinder 52 and the annular spaces in the cylinder assembly. By reason of the grooved rings 31, 46 and 59, the fluid is free to circulate through the annular spaces in response to advance or retraction movement of the telescopic cylinder assembly.

As hydraulic fluid under pressure is directed into the cylinder assembly through fitting 65, the barrel assemblies 21 and 36 and the plunger assembly 51 will be simultaneously projected relatively to the stationary barrel assembly 20 until the external stop ring 33 on cylinder 22 abuts the shoulder 14 on collar 11, at which point further movement of barrel assembly 21 is arrested. Movement of barrel assembly 36 will continue until external stop ring 48 on cylinder 37 abuts the shoulder 24 on collar 23. Similarly, movement of plunger assembly 51 will continue until external stop ring 61 abuts shoulder 39 on collar 38, at which point maximum stroke of the telescopic cylinder assembly is attained.

Due to the fact that the packing collars 11, 23 and 38 are integrated with their respective cylinders, instead of being threadedly secured or bolted, as is customary, there is no chance of leakage of fluid occurring past screw threads or gaskets or similar elements which are involved in conventional securement of packing collars. Furthermore, by utilizing self-constricting resilient sealing elements, such as the O-rings 18, 28 and 43, in lieu of conventional packing, the necessity of providing an adjustable packing gland or collar is eliminated.

During the above-described extension movement of the cylinder assembly, the base plate 62 serves to seal the rear end of the assembly, and is maintained in the position shown in Fig. 1 by the pressure of the hydraulic fluid within the stationary barrel assembly 20.

When the pressure in the cylinder assembly is relieved, the load on element A causes retraction of the plunger assembly 51. The abutment of guide ring 59 with internal stop ring 50 on cylinder 37, in turn, causes retraction of barrel assembly 36. The abutment of guide ring 46 with internal stop ring 36, in turn, causes retraction of barrel assembly 21. Thus, by the sequential interengagement of the respective guide rings and internal stop rings, the plunger and movable barrel assemblies are returned to the position shown in Fig. 1.

If, for any reason, any of the components of the cylinder assembly need to be inspected or replaced, it will be apparent that removal of the shaft 66 from the cylinder 10 will permit base plate 62 to be slidably withdrawn and thus will permit inspection of the interior of the cylinder assembly. For purposes of inspection the barrel assemblies 20, 21 and 36 may be moved or extended rearwardly relatively to each other and to the plunger assembly 51.

For overhaul or complete disassembly of the unit, the removal of base plate 62 permits immediate access to the internal stop rings 35 and 50, which are split or snap-type rings. By removal of rings 35 and 50, the several sub-assemblies can be separated from each other. It will be understood that an interfering part, such as bleeder screw 56, would, of course, be first removed.

It may be noted at this point, that one or more small openings 69 are preferably provided in the wall of cylinder 10 rearwardly of base plate 62. The aperture 69 permits insertion of a suitable retaining element, such as a cotter key, to temporarily hold the base plate 62 in position during shipment of the cylinder assembly.

The structure of the cylinder assembly, herein described, thus eliminated the need for the expensive machining operations required to provide the threaded securement customarily employed in units of this type, as well as providing a slidable base plate structure which is readily removable to allow convenient access to the interior of the cylinder assembly. The cylinder assembly is therefore capable of being produced at a substantially lower initial cost than comparable prior art telescopic cylinders, and the time and expense of inspection and maintenance is also considerably reduced.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In a telescopic cylinder assembly, the combination of a stationary barrel assembly, a movable barrel assembly telescopically engaging said stationary barrel assembly, a sealing collar integrated with the forward ends of each of said barrel assemblies, a plunger assembly telescopically engaging said movable barrel assembly, cylinder sealing means slidably mounted in said stationary barrel assembly rearwardly of said plunger assembly and said movable barrel assembly and movable rearwardly in response to actuating pressure in said cylinder assembly, and a connector element removably mounted on said stationary barrel assembly for pivotally securing said cylinder assembly to a reaction member, said element being disposed in the path of rearward movement of said cylinder sealing means.

2. In a telescopic cylinder assembly, the combination of a stationary barrel assembly, a sealing collar integrated with the forward end of said assembly, a movable barrel assembly telescopically engaging said stationary barrel assembly in sealing engagement with said sealing collar, a second sealing collar integral with the forward end of said movable barrel assembly, a plunger assembly telescopically engaging said movable barrel assembly in sealing engagement with said second sealing collar, cylinder sealing means slidably mounted in said stationary barrel assembly rearwardly of said plunger assembly and said movable barrel assembly and movable rearwardly in response to actuating pressure in said cylinder assembly, and connector means for pivotally securing said cylinder assembly to a reaction member, said connector means being disposed in the path of movement of said cylinder sealing means to limit sliding movement thereof.

References Cited in the file of this patent

UNITED STATES PATENTS

| | | |
|---|---|---|
| 1,928,533 | Goss | Sept. 26, 1933 |
| 2,502,290 | Szitar | Mar. 28, 1950 |
| 2,513,476 | Griffith | July 4, 1950 |
| 2,689,547 | Pearson | Sept. 21, 1954 |
| 2,692,584 | Armington | Oct. 26, 1954 |
| 2,790,462 | Ashton | Apr. 30, 1957 |

FOREIGN PATENTS

| | | |
|---|---|---|
| 569,311 | Great Britain | May 17, 1945 |